(No Model.)
M. GOLDBERG.
APPARATUS FOR ADMINISTERING MEDICATED VAPORS.
No. 279,091. Patented June 5, 1883.
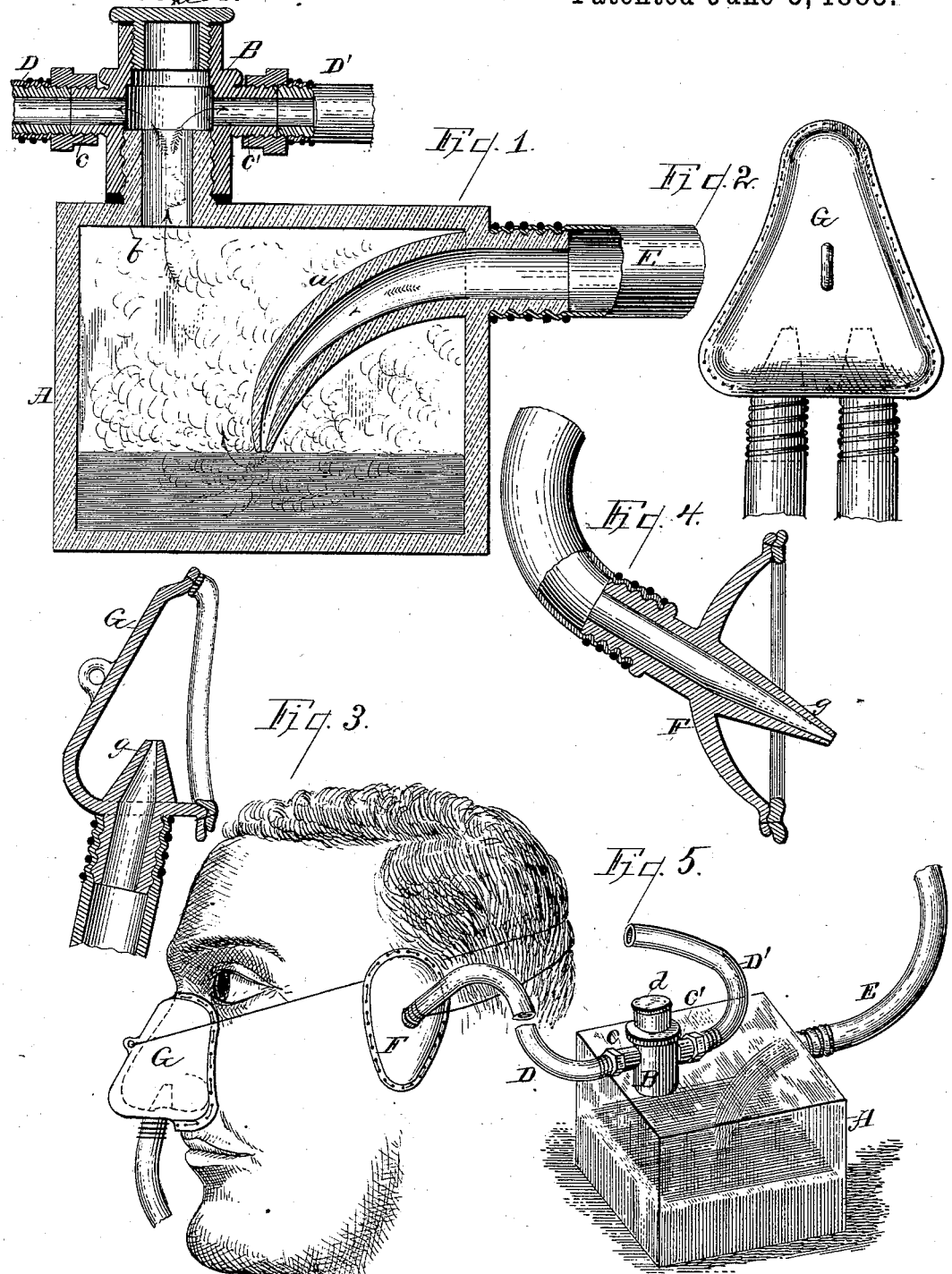
Witnesses:
E. G. Asmus
Carl Pickhardt
Inventor:
Max Goldberg
By
Stout & Underwood
Attorneys.

UNITED STATES PATENT OFFICE.

MAX GOLDBERG, OF MILWAUKEE, WISCONSIN, ASSIGNOR OF ONE-HALF TO WILLIAM S. COOPER, OF PHILADELPHIA, PENNSYLVANIA.

APPARATUS FOR ADMINISTERING MEDICATED VAPORS.

SPECIFICATION forming part of Letters Patent No. 279,091, dated June 5, 1883.

Application filed May 19, 1882. (No model.)

*To all whom it may concern:*

Be it known that I, MAX GOLDBERG, of Milwaukee, in the county of Milwaukee, and in the State of Wisconsin, have invented certain new and useful Improvements in Apparatus for Administering Medicated Vapors; and I do hereby declare that the following is a full, clear, and exact description thereof.

My invention relates to devices for treating the eyes, ears, nose, mouth, and genital and fecal organs of the human body for chronic affections thereof, and will be fully described hereinafter.

In the drawings, Figure 1 is a section of a glass case for containing the balsam of roots and receiving the steam which conveys its essential vapor out to the patient. Fig. 2 is a front view of the nose-shield. Fig. 3 is a section thereof; Fig. 4, a section of the ear-shield, and Fig. 5 of the whole apparatus in position for treating the nose and ears.

A is a glass box, having a tube, *a*, cast in one side, that is curved and diminishes in size until its lowest point is within about a third of the depth of the box from its bottom, and on top this box A is provided with a screw-threaded nipple, *b*, to receive coupling B. This coupling B has branches *c c'*, as shown, to which I propose, when necessary, to couple, respectively, rubber tubes D D', for treating the ears; or I may, by such a cap as shown at *d*, but smaller, close either of the orifices or branches and use but one tube when I desire to treat a single organ, such as the nose or mouth; or I may in a like manner close both of the branches *c c'*, and, removing cap *d*, attach a large tube to the coupling in its stead, and by it lead the medicated vapor to the organs of generation or to the anus.

The operation of my apparatus is as follows: I partly fill the box A with balsam made from the combination of such roots as I claim make a specific for the particular disease to be treated, and then, connecting the box with any steam-generator by a tube, E, I place the particular shield for the organ to be treated on the patient. I turn the steam on, which, as it enters the box, will flow into the balsam, and, vaporizing it, force it out in the form of vapor through the nipple *b* to the tubes that lead to the organ or organs which I design to treat with such force that the vapor will be caused to permeate all the crevices and channels of the diseased part, and thus by my apparatus I am able to send the proper curative agent wherever it may be needed.

The ear-shields are marked F, the nose-pieces G, and the tubes for entering the organ to be treated are marked *g*.

What I claim as my invention, and desire to secure by Letters Patent, is—

An apparatus for vaporizing balsam and administering the medicated vapors thereof to the various organs of the human body, consisting of the receptacle A, having inlet-tube *a*, extending from near the top, through one side, within and to near the bottom in the center of said receptacle, the said tube diminishing in diameter from inlet to outlet, and connected to tube E, adapted to communicate with a steam-generator, in combination with the outlet-tube *b*, multiple-branched coupling device B, a plurality of tubes, D, connected therewith, shields G, for covering the organs to be treated, and tubes *g*, communicating with tubes D, and diminishing in diameter toward their outlet within or beyond the said shields, whereby contact of the said organs with the outside air may be prevented and a plurality of organs treated simultaneously, substantially as set forth.

In testimony that I claim the foregoing I have hereunto set my hand this 17th day of March, 1882.

MAX GOLDBERG.

Witnesses:
S. S. STOUT,
HAROLD G. UNDERWOOD.